Aug. 2, 1938.  H. G. LYKKEN ET AL  2,125,382
MEANS FOR DRYING MATERIAL
Filed Dec. 8, 1933    7 Sheets-Sheet 2

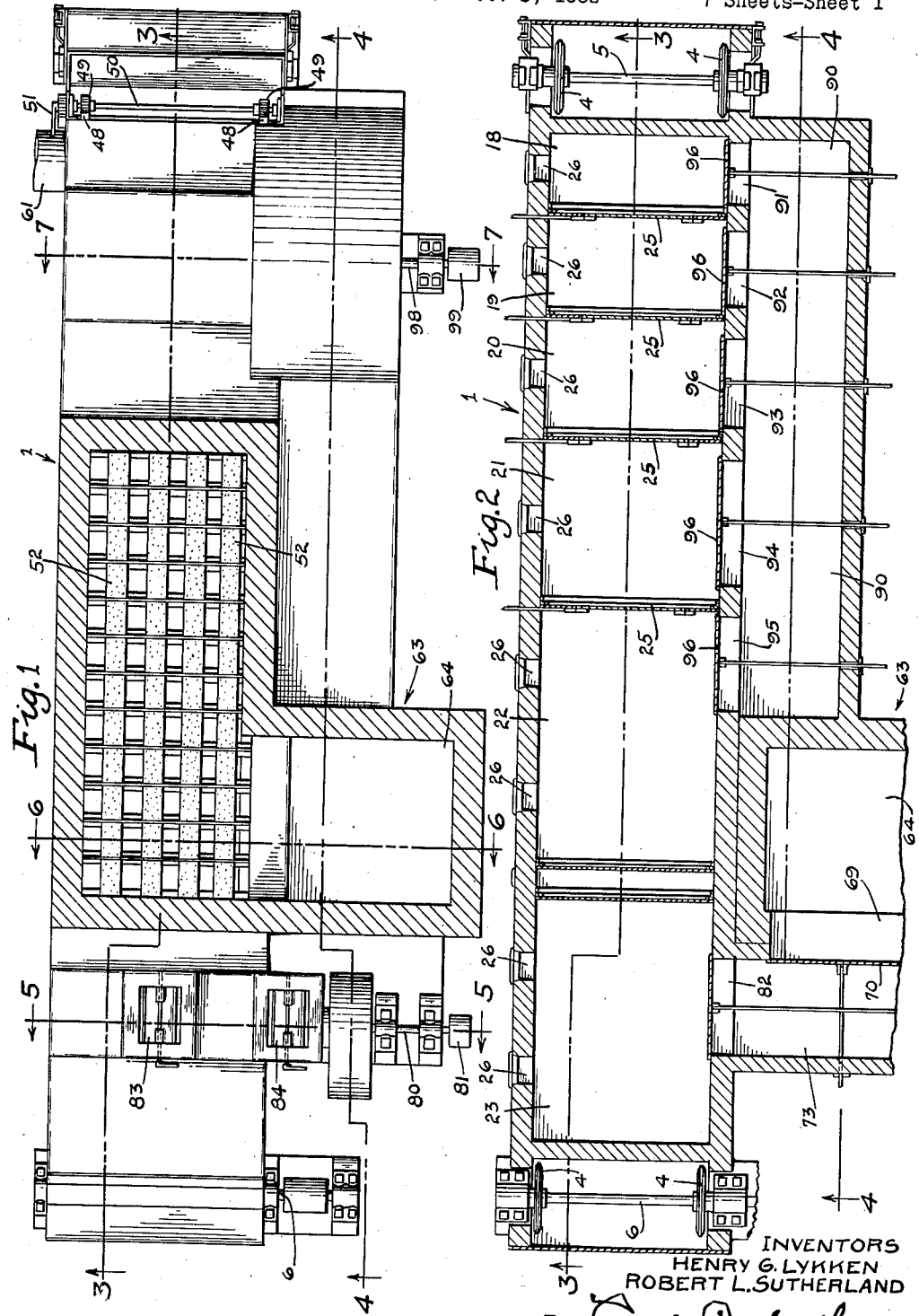

INVENTORS
HENRY G. LYKKEN
ROBERT L. SUTHERLAND
ATTORNEYS

Aug. 2, 1938.     H. G. LYKKEN ET AL     2,125,382
MEANS FOR DRYING MATERIAL
Filed Dec. 8, 1933     7 Sheets-Sheet 3

INVENTORS
HENRY G. LYKKEN
ROBERT L. SUTHERLAND
ATTORNEYS

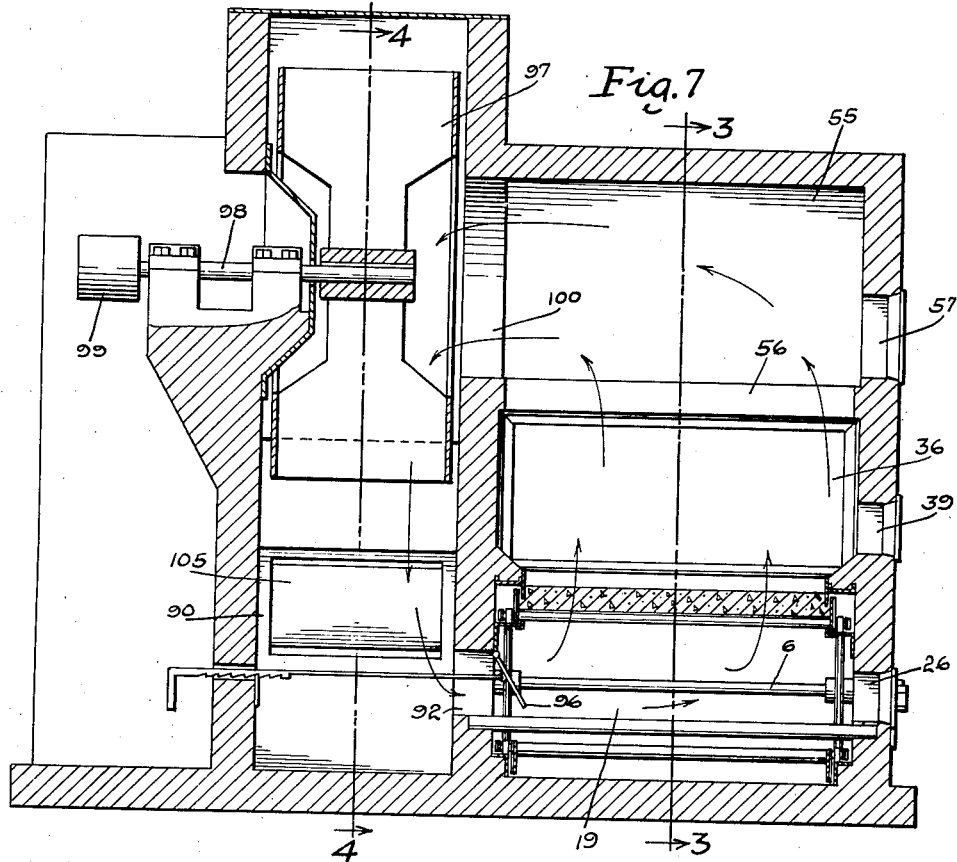
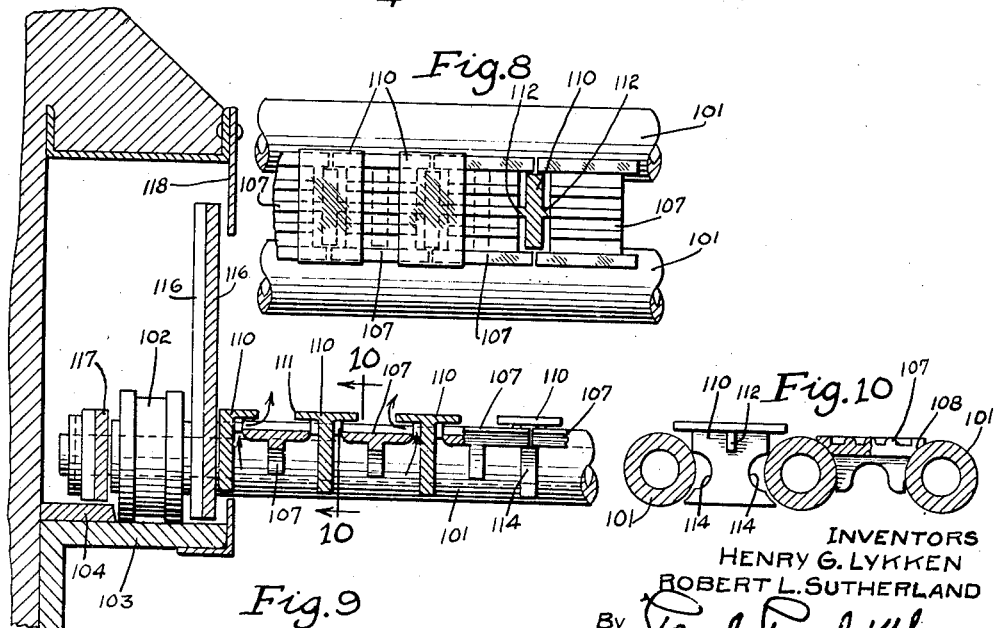

Aug. 2, 1938.   H. G. LYKKEN ET AL   2,125,382
MEANS FOR DRYING MATERIAL
Filed Dec. 8, 1933   7 Sheets-Sheet 5
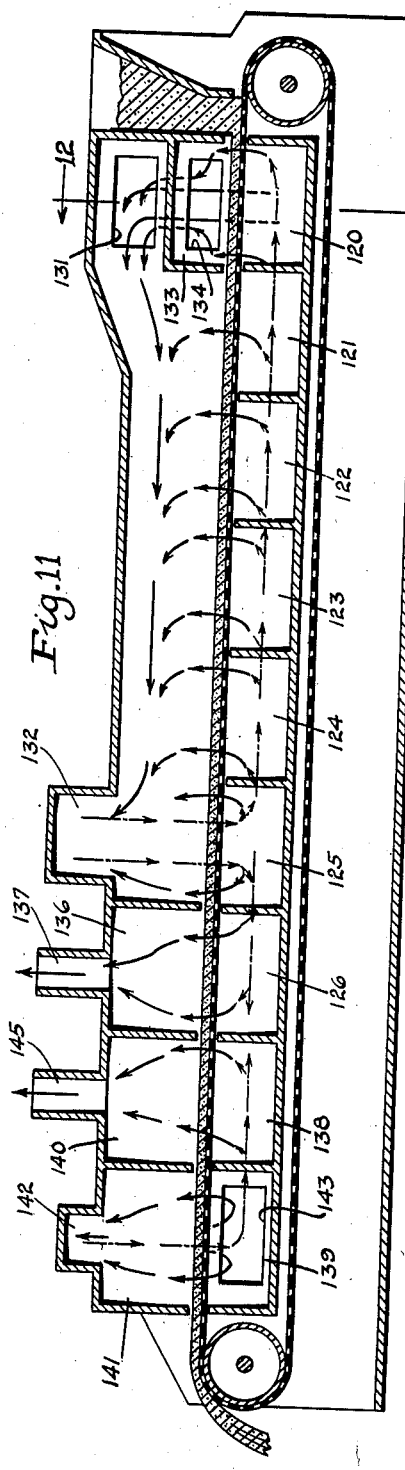
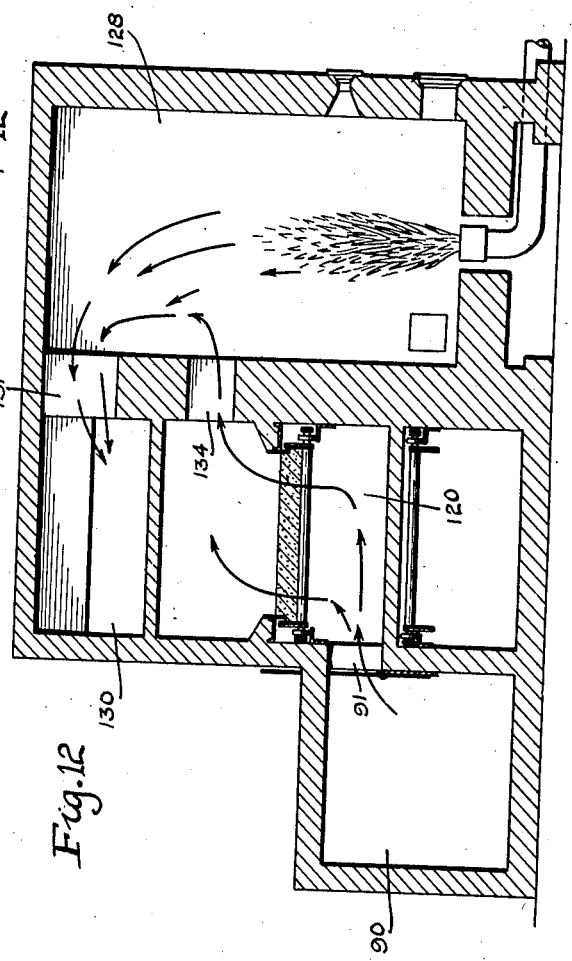
INVENTORS
HENRY G. LYKKEN
ROBERT L. SUTHERLAND
By Paul, Paul & Moore
ATTORNEYS

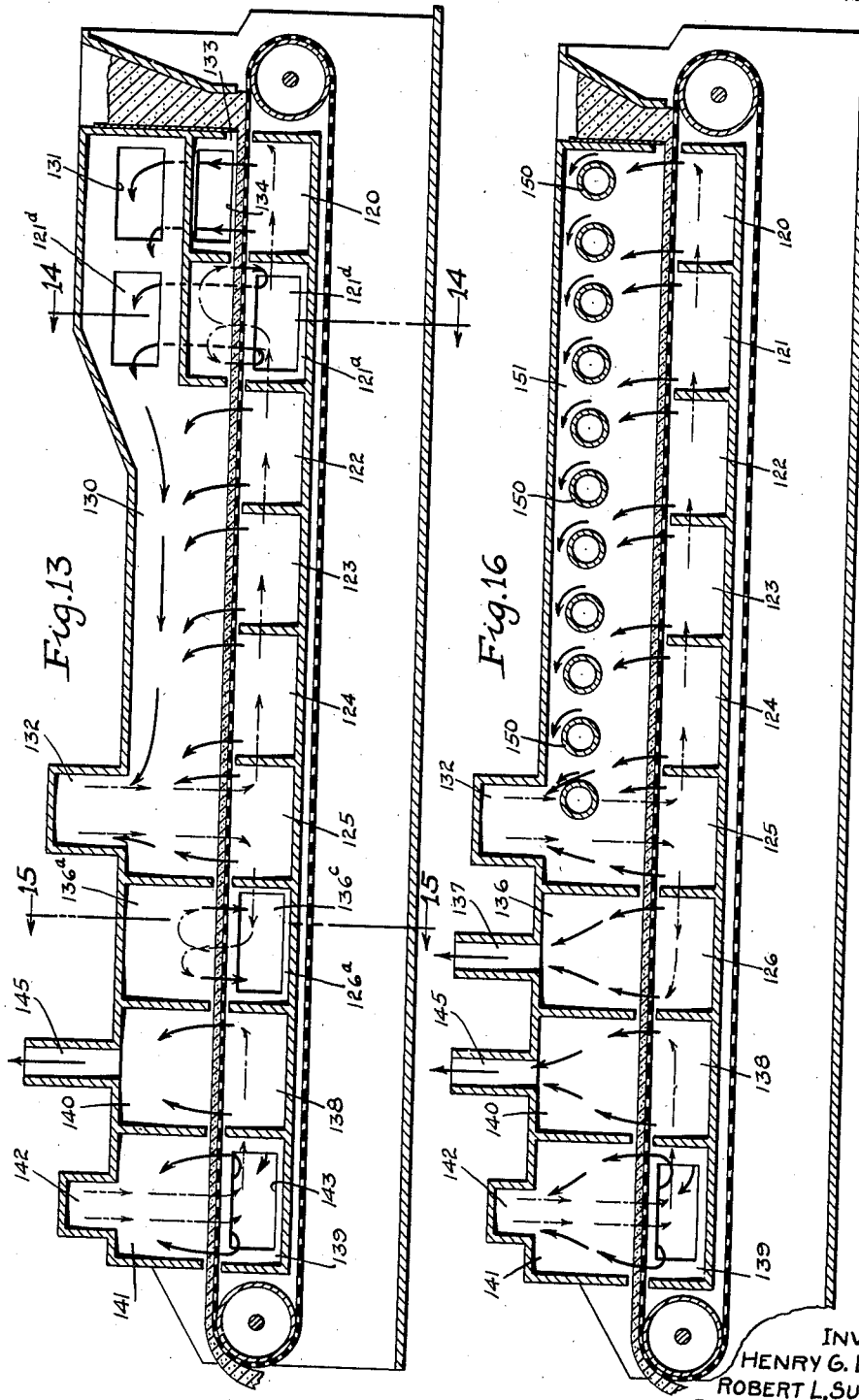

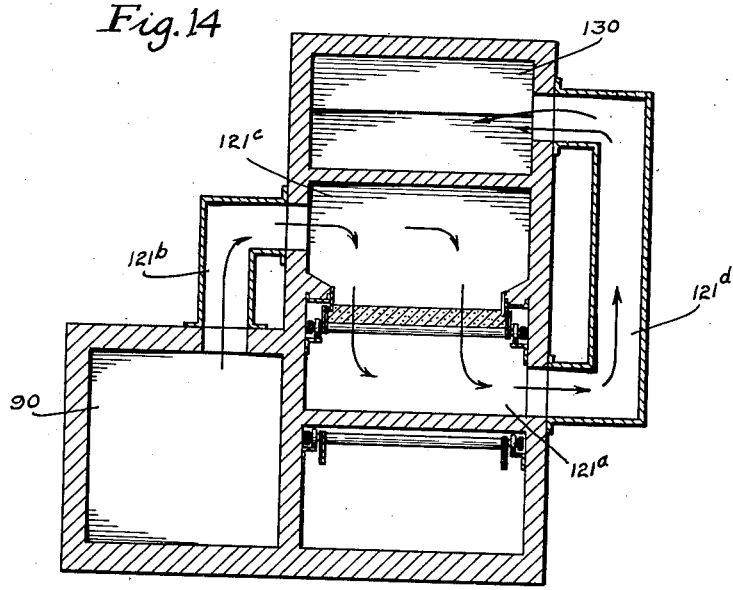
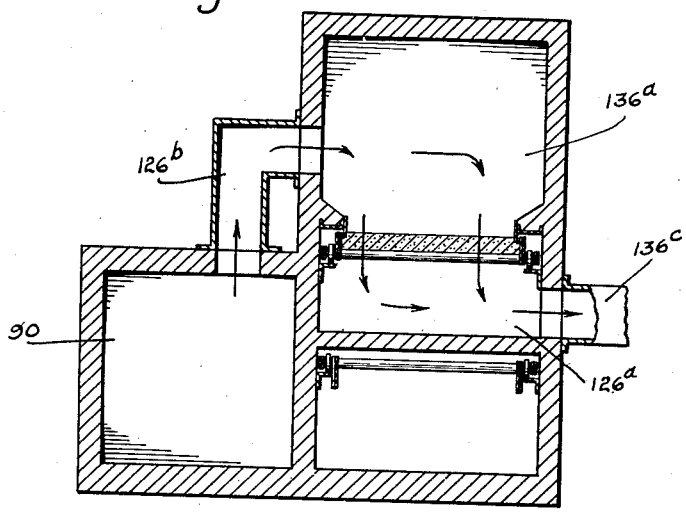

Patented Aug. 2, 1938

2,125,382

UNITED STATES PATENT OFFICE 2,125,382

MEANS FOR DRYING MATERIAL

Henry G. Lykken, Minneapolis, Minn., and Robert L. Sutherland, Winnipeg, Manitoba, Canada; said Sutherland assignor to Northern Coal Products Co., Minneapolis, Minn., a corporation of Delaware Application December 8, 1933, Serial No. 701,504

15 Claims. (Cl. 34—12)

This invention relates to an apparatus for drying materials of various kinds, such as granular or fibrous material, including coals, or any material which can be so arranged that a drying medium can be passed therearound or therethrough. The invention also relates to that class of drying apparatus in which the material is spread in layers of suitable thickness over a porous surface preferably a continuous porous apron or conveyor, so that the process can be made continuous and progressive.

The use contemplated herein includes the passage of any quantity of any suitable drying medium at any desired temperature, through a body of material containing the moisture which it is desired to evaporate. After passing through a bed of the material, the fluid is reheated by suitable means, and is again passed through the material.

The invention provides a new and novel means for bringing the material and its contained moisture up to and maintaining it at the evaporating temperature of the moisture contained in the material. Uses include recirculation, and reheating of the medium preferably each time it is passed through the material in order to continually impart as much heat as possible, or as may be required, to the material. The heating or reheating may be effected in a number of ways, and there is no intention to be limited to any particular method of heating.

Objects, features and advantages of the invention will be set forth in the description of the drawings forming a part of this application, and in said drawings Figure 1 is a plan section of our improved drier taken approximately on lines 1—1 of Figures 3 and 4;

Figure 2 is a horizontal section taken approximately on lines 2—2 of Figures 3 and 4;

Figure 7 is a transverse section taken approximately on lines 7—7 of Figures 1 and 4;

Figure 8 is a detail plan of a portion of the porous conveyor;

Figure 9 is a vertical section illustrating the track for the roller supports for the conveyor and the sealing elements;

Figure 10 is a somewhat diagrammatic vertical longitudinal section approximately on line 10—10 of Figure 9, showing a portion of the conveyor structure;

Figure 11 is a diagrammatic view illustrating a modification of a direct heating type of apparatus;

Figure 12 is a vertical transverse section on line 12—12 of Figure 11;

Figure 13 is a diagrammatic view showing another modification of the direct heating type of apparatus, and illustrating the reverse flow scheme;

Figure 14 is a transverse section on line 14—14 of Figure 13 illustrating the reverse flow arrangement, at the receiving end of the machine;

Figure 15 is a transverse section on line 15—15 of Figure 13 showing the reverse flow arrangement at the far end of the drying section; and Figure 16 is a diagrammatic view illustrating an apparatus for carrying out the indirect heating method.

Figures 3, 4:
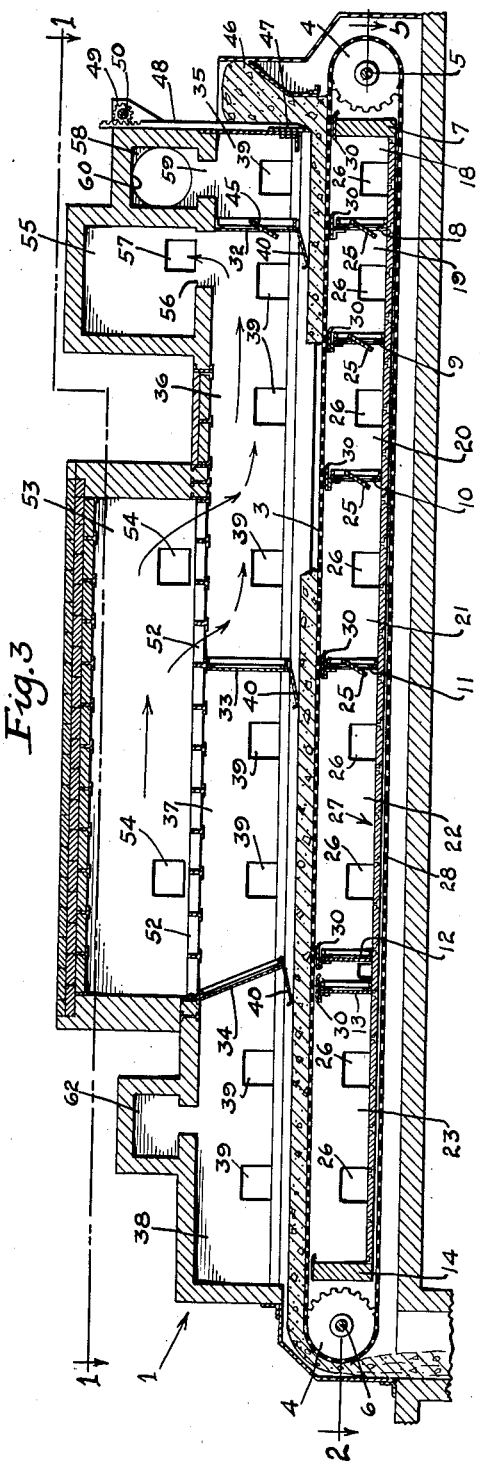
Figure 3 is a vertical section taken approximately on lines 3—3 of Figures 1, 2 and 7.
Figure 4 is a vertical section taken approximately on lines 4—4 of Figures 1, 2 and 5.

Numeral 1 generally indicates a horizontally elongated structure, providing an elongated space divided into upper and lower chambers by means of one run of an endless "porous" conveyor, specially constructed to support a layer of the material, in substantially horizontal position while allowing the passage of the drying fluid through the material thus supported. Any form of conveyor, suitable for the purpose herein, may be used. The preferred structure is shown in Figures 8 to 10, inclusive.

The upper run 3 of the conveyor forms a moving partition between the upper and lower chambers. The conveyor chains are controlled by sprocket wheels 4, see Figures 2 and 3, carried by shafts 5 and 6 respectively arranged at extreme opposite ends of the structure. Between the runs of the "porous" or "foraminous" conveyor are arranged vertical partitions 7, 8, 9, 10, 11, 12, 13 and 14 providing compartments 18 to 23, inclusive, and it will be noted that these compartments vary in length being successively elongated in direction of motion of the material. Each of the vertical partitions 8 to 11 is provided with a damper 25. By properly adjusting the dampers, parts of the drying medium can be diverted into adjacent chambers.

Chambers 18 to 22, inclusive, are part of the drying section of the apparatus, and chamber 23 is part of the cooling section. Of course, the sizes of these lower chambers may be varied, and two or more lower chambers may be provided for the cooling section.

Each of chambers 18 to 21, inclusive, is provided with a clean-out opening 26, and each of chambers 22 and 23 is provided with two such openings. Suitable closures are provided for the openings. The floors of all lower chambers are formed by a suitable structure generally indicated at 27. This floor-forming element lies immediately adjacent and above the lower run 28 of the conveyor. Suitable plates 30 substantially establish a seal between the partitions and the lower surface of the upper run 3 of the conveyor. The upper chamber is divided by vertical partitions 32, 33, 34 into chambers 35, 36, 37 and 38, having clean-out openings 39. At the lower end of each partition is a hinged seal plate 40 which rests upon the moving charge. In the partition 32 is a damper 45 controlling an opening which establishes communication between chambers 35 and 36, so that part of the circulated medium delivered to chamber 35 can be diverted into chamber 36.

A hopper 46 delivers material to the upper run of the conveyor, the height or thickness of the layer being controlled by a gate 47 having racks 48 meshing with gears 49 carried by shaft 50, said shaft being controlled in any suitable manner as by crank 51.

The top of the partition 33 has a sealing engagement with a T-iron which is part of a checker work structure comprising the usual bricks 52, spaced to provide the usual openings. The checker work forms a partition between chambers 36 and 37 and a mixing chamber 53, built on top of the structure. The chamber is provided with clean-out openings 54. Also above the chamber 36 is a chamber or dome 55 communicating with the chamber 36 through opening 56. This chamber also has a clean-out opening 57. Chamber 55 communicates with a fan chamber later to be described. Chamber 35 communicates with chamber 58 through opening 59, and chamber 58 has opening 60 which communicates with pipe 61 leading to the atmosphere.

Above the upper chamber 38 of the cooling section is a chamber 62 which communicates with a suitable fan in a manner below described.

Figure 6:
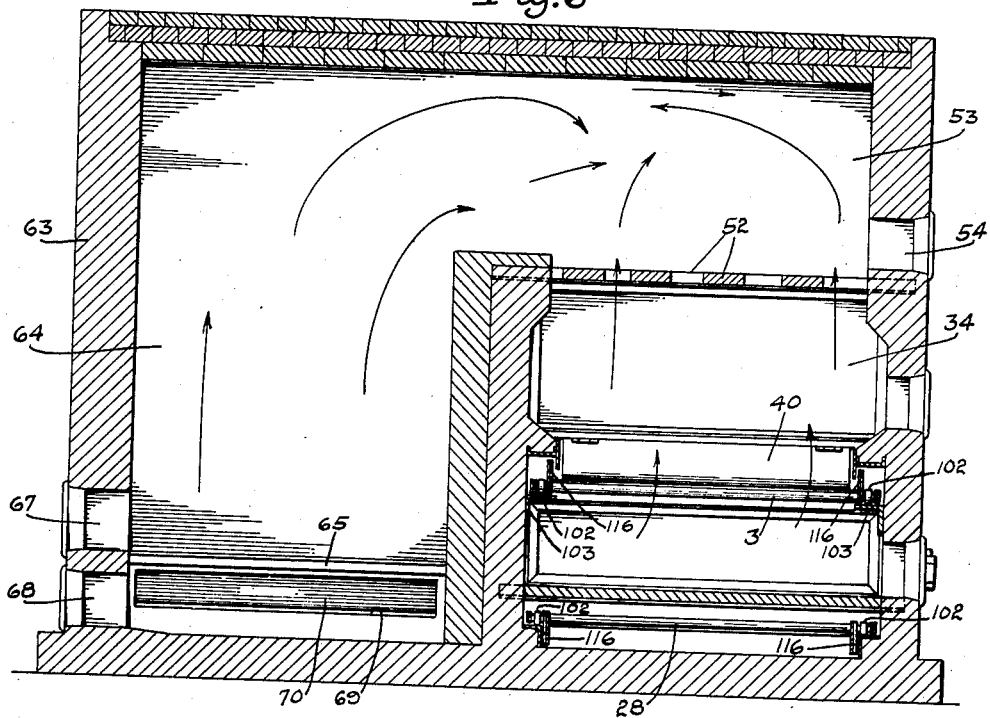
Figure 6 is a transverse section taken approximately on lines 6—6 of Figures 1 and 4, or through the furnace.

Referring to Figures 1 and 4 there is arranged laterally of the structures, previously described, a furnace structure generally indicated at 63 including a fire chamber 64, and grate 65, said furnace chamber communicating, see Figure 6, with the chamber 53. The furnace is provided with firing opening 67 closed by a suitable door. The ash opening is indicated at 68.

Figure 5:
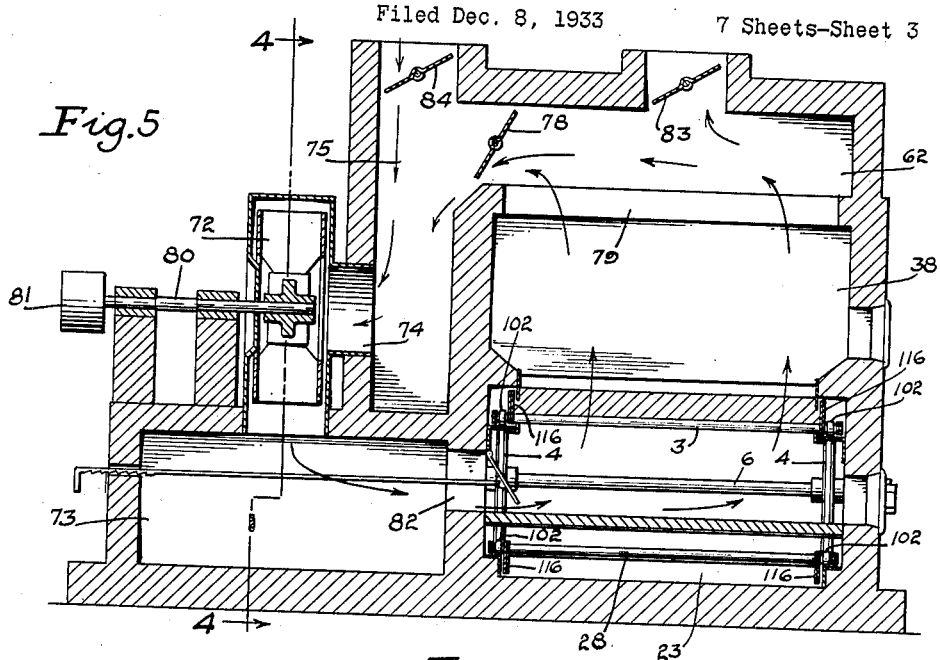
Figure 5 is a transverse section taken approximately on lines 5—5 of Figures 1, and 2.

Fluid from the cooling section can be diverted into the furnace through opening 69, see Figures 4 and 5, controlled by damper 70, the draft being furnished by a fan 72 delivering into chamber 73, which chamber 73 is in turn connected with chamber 75, see Figure 5, by means of pipe 74. A damper 78 controls flow between chamber 62 and passage 75, and chamber 62 communicates with upper chamber 38 through passage 79. The fan 72 is suitably mounted on shaft 80 driven by pulley 81. Communication between chamber 73 and lower chamber 23 is through damper-controlled opening 82, see Figure 5. The fan 72 therefore can act both to divert fluid to the furnace and as means for circulating cooling medium or fluid upwardly through the bed of material. Dampers 83, 84 respectively control the amount of discharged moisture-saturated medium to the atmosphere, and the amount of air or other drying medium admitted to the system.

Referring to Figures 2, 4 and 7: Arranged laterally of the conveyor chambers is a chamber or manifold 90 which communicates with lower chambers 18 to 22, inclusive, respectively through openings 91, 92, 93, 94 and 95, each opening being controlled by a suitable damper 96. The sizes of the openings are progressively increased from 91 to 94. In the manifold 90, at the upper part, is arranged fan 97, on shaft 98 having pulley 99. The upper part of the chamber 90 communicates with chamber 36 by means of an opening 100. By means of this single draft fan 97, the drying medium is circulated (in this form of apparatus) to cause drying medium to be passed to chamber 90, thence upwardly through the bed of material to be mixed in chamber 53 with fresh hot inert drying medium generated in the furnace. After mixing, the fluid is recirculated. An opening leads from chamber or manifold 90 to the furnace 64 said opening being controlled by damper 105. By this means, part or all of the medium can be diverted for reheating. In this instance the reheated medium is delivered to chamber 53, above the checker-work. Other arrangements for reheating are illustrated herein.

Figures 8, 9 and 10 show certain structural details of the preferred form of foraminous conveyor. Numeral 101 indicates tubular cross bars, to the ends of which are journaled rollers 102, see Figure 9. Rollers 102 operate on tracks 103 formed in this instance by suitable irons, and by strips 104 laid on the tops of the horizontal flanges of the irons. The elements 104 prevent lateral motion of the roller on track 103. Bridging the tubular members 101 and held in position thereby are elements so arranged as to support the material, and yet allow passage of air or other gaseous or fluid drying medium therethrough. To this end, a series of bridging elements 107 are provided which fit between contiguous tubular elements 101, see Figure 10. These elements 107 have roughened or corrugated upper surfaces, and at the ends are curved as at 108 to conform to the cylindrical surface of the bars 101. To secure the elements 107 against detachment, there are provided other elements 110 which have flanges 111 which overlap the upper or outer surfaces of the elements 107 in a manner to hold them in place. These elements have small spacing lugs 112, see Figure 9, which coact with the lateral faces of the elements 107 to keep them in such spaced relation that fluid can pass upwardly, as shown by the arrows in Figure 9, and thence through a bed of material supported by said elements. The elements 110 are held against movement from between the tubes 101 in the manner shown in Figure 10, that is by notching each element on opposite sides as at 114, so that portions of this notch lie at opposite sides of a horizontal line passing through the centers of the tubes. The elements 110 may be called locking elements, in that they are the ones which prevent elements 107 from falling out of position when all elements move to constitute the lower run of the conveyor. A seal must be maintained laterally of the conveyor and this is accomplished by means of link plates 116, cooperating with elements 118 attached to the chamber structure, see Figure 9. These plates are pivotally mounted on the tubular members 101. The link plates with links 117 form chains which pass over the sprockets 4.

*Drying operation.*—Assuming that a layer of material to be dried has been deposited on the conveyor. Steam may be produced at furnace 64, or fuel may be burned therein to produce heated inert drying fluid. The drying medium thus generated may have an initial temperature of 212° F. or above, at which temperature the moisture in the material will leave as steam or vapor. Super-heated steam may be used; or gaseous products of combustion of fuel at suitable temperature and preferably low in oxygen content, may be used. This medium is introduced into the chamber 53 over the checker work 52, and passes in direction of the arrows through chamber 53 downwardly through the checker work into upper chamber 36 upwardly through opening 56 into chamber or dome 55, see Figure 7, thence past the fan downwardly into distributing chamber or manifold 90, thence through the openings 91 to 95, inclusive, past the dampers 96 into the chambers 18 to 22, inclusive. The dampers or valves 96 are of course set to admit the desired volume of gas at the desired velocity into the chambers 19 to 22, inclusive.

Part or all of the fluid passing from the chamber 18 (through the very moist entering material) into the chamber 35, passes to the atmosphere while that passing through the bed into the chambers 36 and 37 is mixed with incoming hot gas from the furnace and is delivered through the openings 56 into the chamber 55 thence to the fan 97, chamber 90 to be recirculated. In this instance, a single fan 97 provides the power for circulating the drying medium.

The drying fluid circulated and recirculated is so managed as to bring the material and its contained moisture up to and maintain it at the desired evaporating temperature of its moisture. The process is intended to be continuous. The material in a relatively thin path or layer moves continuously between the upper and lower chambers. Some portion or all of the fluid introduced into the chamber 90 may be reheated at each recirculation by passing material through the opening controlled by damper 105 into the furnace.

The invention provides means whereby all of the medium can be reheated after it is passed through the material in order to continually impart as much heat as possible or as may be required to the material. This reheating may be effected in more than one way. For example, additional high temperature gas may be added from the combustion of fuel in the furnace and this gas can be added to the fluid rising from the bed, see Figure 3. This is a feature and an advantage because it is obvious that the maintaining of a temperature as high as possible above the bed will impart some heat to the top portion of the bed. Thus the temperature of the fluids above the bed of the material will be higher than below the bed, due to the addition of hot initial fluid (before mixing with cooled fluid from the warming section). No reversal of flow of the drying medium in the drying section is provided. Control of the gas temperature, rather than control of direction of flow of the drying medium is a feature of the invention and is depended upon to equalize drying across the body of the material. This is a very important and efficient method of control and operation. The hot fluids from the furnace enter the chamber 53 above the fuel bed, and mix with the gases of lower temperature and higher saturation resultant from passage through the bed. The average temperature is increased, the vapor pressure of the moisture in the combined gases is reduced. As a result, these gases in contact with the fuel bed at its upper surface have an additional drying effect which tends to equalize the amount of drying as between the lower and upper sections of the bed.

Another advantage is that it eliminates possibility of condensation from the vapor-ladened fluid rising from the bed. This may be termed the indirect method of reheating. As before stated, the circulation and recirculation is carried out so as to bring the temperature of the material up to and maintain it at the desired evaporating temperature of its contained moisture causing the moisture to leave the material and mingle with the circulated fluid. In this manner, heat is imparted to the material until the desired amount of drying has been effected.

Provision is made for voiding a portion of the medium to the atmosphere progressively, this being accomplished in the first form of the apparatus by ejecting through pipe 61. The amount of medium discharged to the atmosphere will be equal to the quantity of gas added to effect reheating, plus the amount of moisture evaporated. In some cases, as when the medium is indirectly heated, see Figure 15, the amount of medium discharged to the atmosphere will be equal to the amount of moisture evaporated. In the case where superheated water vapor alone constitutes the medium reheated by the indirect method, the discharge will be water vapor only. When using a mixture of dry gas and water vapor, only part of the fluid passes through pipe 61 to the atmosphere, while the balance passes through damper 45, in partition 32 into chamber 36 and into chamber 55 through opening 56.

An important point is the fact that a substantially inert medium may be used when drying combustible material such as coal. The drying medium consists of products of combustion, containing only a small percentage of oxygen, and a relatively large percentage of water vapor produced by the drying operation itself. By using a portion of the medium rising through the bed, for dilution of the products of combustion either in the furnace or in a mixing chamber connected with the furnace, it is possible to burn the fuel so that resultant products of combustion have a minimum of oxygen content. The main purpose of this is to produce gas of low oxygen content and a maximum temperature of the initial gas, the latter to reduce the quantity of gas required to be recirculated. By controlling the proportions of gas generated in the furnace, and the medium rising from the fuel bed, any desired temperature can be obtained at any point in the system.

The invention provides for the control of the quantity of circulating medium admitted at any point along the path of travel of the material to effect more vigorous heating at certain points, than at others. The device also provides means for obtaining a regulatable rate of travel of the material, and provides means such as gate 47 for controlling the thickness of the layer or bed.

Super-heated water vapor may in part be used and may be reheated by the indirect method where the nature of the material dried would indicate that furnace gases should not be used. The medium may be clean air or other gases, indirectly heated, where the nature of the material permits the use of air, and where the material might be contaminated if furnace gases were used. In many operations, the direct heating of the medium by addition of furnace gases proves more economic and more simple of operation, particularly where coal is to be dried and where the use of an inert medium is desired.

*Cooling.*—The drying operation may be carried on without subsequent cooling of the dried material. In many operations it is desirable to cool the material below the temperature maintained in the drier, or below the temperature of the dried material. In connection with such cooling, additional drying can be effected by the utilization of residual heat in the material and its moisture content.

In case the dried material, such as combustible fuel, is to be passed directly to a stoker or pulverizer, cooling as part of the drying process is not necessary. However, in some cases, it is desirable to cool the material after drying and before storing.

For this purpose, see Figure 5, the section including chambers 23, 38 and fan 72 and various connecting passages are provided. The material moving on the conveyor merely continues its movement to pass between the chambers 23 and 38. This series of one or more chambers is arranged at the discharge end of the drier, and in these chambers the material may be subjected to circulation and recirculation of air or other gas. This circulation and recirculation may be carried out in a manner similar to that used in drying, and in this instance an independent fan is provided.

The thermal efficiency is higher when the cooling medium is at or near the same temperature as the material to be cooled, providing the humidity of the drying medium is low. Entry of air into the system is controlled by the damper 84. The air passes through pipe 74 past fan 72 into chamber 73 through opening 82 into chamber 23, thence through the bed of material into chamber 38, thence through opening 79 to chamber 62. Part of the moisture laden fluid may be exhausted to the atmosphere past valve 83 and a portion is returned past valve 78 and mixed with incoming air in chamber 75. It is noted that, in this instance, as in the first instance, part of the medium after passage through the material may be mixed with incoming fresh medium such as air, to be recirculated.

Considerable drying effect is obtainable from the residual heat in the material being dried. Part of the air entering the cooling system may be deflected to the furnace past the damper 70 through the opening 69.

In Figure 11 has been shown somewhat diagrammatically a modification of direct heating which differs from the first form of the invention, in placing the furnace or generator at the receiving end of the conveyor and placing the fan at the delivery end, or near the cooling section, when such a section is used. This structure includes the chamber 90, see Figure 12, from which the circulated fluid is delivered through suitable damper controlled openings such as 91, 92, etc., into respective chambers 120 to 126, inclusive. Referring to Figure 12 which is a transverse section on line 12—12 of Figure 11, the furnace is indicated at 128, and in it is burned suitable fuel to provide a preferably inert gas which is delivered into the chamber 130 through opening 131, see Figure 12. The drying medium is then delivered to the fan conduit 132, see Figure 11, and is forced by the fan, not shown, to a manifold 90, thence through damper-controlled openings such as 91 etc., to the chambers 120 to 126, and then upwardly through the bed of material. Dot-and-dash line arrows are used to indicate the course of fluid flow from the pressure side of the fans to the manifold 90, or equivalent chamber. The material, as in the first case, is delivered to the conveyor to form a bed of the proper thickness, and the conveyor moves continuously during the operation.

That portion of the fluid delivered from the first chamber 120 through the bed enters chamber 133, and passes therefrom to the furnace through opening 134 to be reheated and delivered through opening 131 into chamber 130 above the bed of material being dried. A portion of the fluid medium after passage through the bed is voided to the atmosphere through chambers 126, 136 and passage 137. The conduit (not shown) which is separate from the manifold connects the pressure side of the fan with chamber 126. In this instance, the voiding takes place from the last chamber of the drying section, instead of the first as in Figure 3.

In this case, as in the other case, there is a cooling section, but it is composed of two sets of lower and upper compartments 138 and 139 respectively below compartments 140, 141. The fan chamber is indicated at 142 and atmospheric air is drawn in through opening 143 into lower chamber 139 passed through the material into chamber 141, thence through the fan into chamber 138 through material to chamber 140 thence to the atmosphere through pipe 145.

In Figure 13 has been illustrated another modification of a structure related to direct reheating method, in which a reversal of flow of the fluid through the bed is provided for in certain chambers. There is no intention to be limited as to the particular chamber in which the flow is reversed. The structure including the furnace and compartments 120, 133, openings 134, 131, is the same as in Figure 11, and the material takes the same course by way of the fan to compartments 120, 122, 123, 124 and 125, etc.

In this form, reverse flow takes place from compartments 121$^c$ into compartment 121$^a$, and from compartment 136$^a$ into compartment 126$^a$. Referring to Figure 14, which is a cross-section on line 14—14 of Figure 13, the course of the drying medium after generation and passage through chamber 130 and past the fan is from the manifold 90 upwardly through a conduit 121$^b$ into chamber 121$^c$ thence downwardly through the bed into chamber 121$^a$ through conduit 121$^d$ back to mixing chamber 130, above the bed.

Referring to Figure 15, which is a section on line 15—15 of Figure 13, the course of the fluid is from the manifold 90 upwardly through passage 126$^b$ into compartment 136$^a$ downwardly through the bed into compartment 126$^a$ thence through pipe 136$^c$ to the atmosphere. A greater number of compartments may have the flow reversed therein (by the addition of elements which are the functional equivalents of elements 121$^b$, 126$^b$, etc.) without departing from the spirit of the invention.

In Figure 16 is shown a third structural modification related to the method of indirect heating. For this purpose pipes or muffles 150 are arranged above the bed of the material in chamber 151 (corresponding to chamber 130) and a furnace, not shown, supplies heated material which is passed through these muffles. In this figure, the structures for generating or supplying the drying fluid have not been shown, but it will be readily understood how the gas is circulated and recirculated through the chambers 120 to 125 through the bed to chamber 150 into contact with pipes 150, thence to 137, fan, etc.

The main object here is to indirectly heat the fluid after passage through the bed and to recirculate the same, and also to void a certain portion of the mixture to the atmosphere, after passage through the bed. These reheating surfaces 150 may be in adjacent chambers instead of in chamber 151 directly over the bed.

The cooling sections of Figures 11, 13 and 15 are herein shown as operating in the same manner.

By regulating the quantity of air going into the combustion chamber the amount of inert fuel generated is controlled. The temperature of the drying medium going to the plenum chambers is also regulated by the dampers. There is a recirculation of the fluid again and again through the fuel bed as often as may be necessary, adding generally all the time some highly heated inert gas in order to maintain the desired temperature and humidity.

It is noted that a quantity of the gas at any desired dry or wet bulb temperature can be passed through a body of material containing water which it is desired to evaporate. After passing through the bed of material, the medium and its contained moisture is reheated by suitable means with or without increase in the quantity of either dry gas or water vapor and is again passed through the bed. There ordinarily is no change in the weight of the dry hot medium circulating in the system up to this point, but there generally is an increase in the weight of water vapor due to evaporation of water from the material. The amount of drying is determined by the difference in temperature between the affluent and effluent fluids and the quantity of the medium circulated.

When drying coal, it is particularly desirable to use an inert atmosphere and furnace gases with as little oxygen as possible are used. To obtain this, the fuel is burned in the furnace with as little excess air as possible. The temperature is generally in excess of 2000 degrees. Hot gases rise and cross over in the chamber or chambers arranged over a horizontal layer of the material to be dried. Being hot, the gas will stay near the roof of the chamber. Meanwhile, the drying medium mixed with moisture of the material rises through the checker work 52, see Figure 3, into chamber 53. This medium comes through in much greater volume than the medium coming through the furnace so that a mixing effect is obtained and there is a reduction in temperature. The mixture is returned to be mixed with fluid which is passed through the fuel bed so that when they reach the fan, see Figure 4, they are at the desired temperature.

Claimed features of the invention include: The means for bringing the material to be dried up to and maintaining it at the desired evaporation temperature of the contained moisture; the use of a substantially horizontal porous conveyor for carrying a bed of material to be dried; means by which the progressive voiding of a portion of the drying medium after circulation through the bed can be accomplished, and also this means in conjunction with means for the maintenance of the material at its evaporating temperature; the use of a porous conveyor and chambers above and below it and the control of the fluid in the chambers, by passage through the bed from chamber to chamber to maintain the temperature of the material at its evaporating temperature; the use of two series of chambers in the manner shown and recirculation; the reheating of the fluid after circulation with either direct or indirect heating; the recirculation of a gaseous medium consisting in part of water vapor from the evaporating moisture of the material; the movement of a porous horizontal conveyor progressively through a chamber or a series of chambers with circulation and recirculation of a gaseous medium consisting in part of water vapor from the evaporated moisture in the material and reheating said medium each time it is recirculated either by passing the medium through heating muffles or moving it into contact with heated surfaces; and all combinations and subcombinations of steps. Other features include the details of construction of the various forms of apparatus.

We claim as our invention:

1. A drier comprising lower series of chambers and an upper chamber, a porous conveyor having a run forming a wall for the chambers and upon which the material to be dried is placed and through which conveyor and material hot drying medium is passed from the lower series of chambers to the upper chamber, means for separately regulating the amount of drying material passing through the material from each lower chamber, a furnace for providing hot drying medium, passages by which the furnace delivers into the upper chamber, and means by which the hot drying medium, after lengthwise passage through the upper chamber, is passed through said lower series of chambers and through the material.

2. A drier comprising a lower series of chambers and an upper chamber, a porous conveyor having a run forming a wall for the chambers and upon which the material to be dried is placed and through which conveyor and material hot drying medium is passed from the lower series of chambers to the upper chamber, means for separately regulating the amount of drying material passing through the material from each lower chamber, a furnace for providing hot drying medium, passages by which the furnace delivers into the upper chamber, checker work through which the drying medium passes before entry into the upper chamber, and means by which the hot drying medium after lengthwise passage through the upper chamber is passed through said lower series of chambers and through the material.

3. A drier comprising a lower series of chambers and an upper chamber, a porous conveyor having a run forming a wall for the chambers and upon which the material to be dried is placed and through which conveyor and material drying medium is passed from the lower series of chambers to the upper chamber, means for separately regulating the amount of drying medium passing through the material from each lower chamber, a furnace for burning material to provide hot drying medium, passages by which the furnace delivers into the upper chamber, means for venting a portion of said hot medium to the atmosphere after passage through the upper chamber, passages by which the remaining portion of said hot medium is led to said lower series of chambers, and means by which a portion of said drying medium can be diverted into said furnace for reheating, instead of being delivered into said lower series of chambers.

4. A drier comprising upper and lower series of chambers, a porous conveyor having a run forming a wall for the chambers and upon which the material to be dried is placed and through which conveyor and material heated drying medium is passed from one series of chambers to the other series, means for separately regulating the amount of drying medium passed through each chamber of one series, a source of hot drying medium and passages by which said medium is delivered to the other series of chambers for mixing with drying medium which has been wet and cooled by passage through the material, and means by which the mixture can be passed to that series of chambers from which it is delivered through the material.

5. A drier comprising an upper mixing chamber, and a lower series of chambers, a porous conveyor having a run forming a wall for the chambers and upon which the material to be dried is placed and through which conveyor and material heated drying medium is passed from the series of chambers to the upper chamber, means for separately regulating the amount of the drying medium passing through the material from each lower chamber, means for adding hot drying medium to the medium in the upper chamber after it has been cooled and wet by passage through the material, and means by which the mixture is passed lengthwise of the conveyor to the lower series of chambers for recirculation through said material.

6. A device of the class described comprising an upper mixing chamber and lower chambers, an endless porous conveyor having a run forming a wall for the chambers and upon which the material to be dried is placed and through which drying medium is passed from one chamber to another, a furnace and means by which it delivers hot drying medium to the mixing chamber, a fan arranged to suck the introduced hot air lengthwise of the mixing chamber, means for venting a portion of the medium in the mixing chamber to the atmosphere, a manifold through which the fan forces the medium from the mixing chamber to the lower chambers, means for each lower chamber by which the amount of fluid delivered from the manifold is regulated for passage from each chamber through the material on the conveyor, means by which drying medium in the manifold can be diverted to the furnace, a cooling section also composed of upper and lower chambers of which the run of the conveyor forms a wall, a second fan, a cold air intake for the fan, a conduit leading from the fan to the lower chambers, a passage leading from said conduit to said furnace, passages leading from the upper chambers respectively to the atmosphere and to the cold air intake, and dampers for controlling said passages.

7. A drier comprising a mixing chamber having a checker work top, a series of chambers, a porous conveyor having a run forming a common wall for all chambers and upon which the material to be dried is placed and through which conveyor a material drying medium is passed from chambers of the series into the mixing chamber, and means causing hot drying medium to pass through the checker to the mixing chamber, thence through any number of the chambers of the series, thence through the material back to the mixing chamber.

8. In a drier a lower series of chambers, a substantially horizontal porous conveyor forming the top wall of the said chambers, a series of chambers above the conveyor of which a layer of material on the conveyor forms the bottom wall, checker work forming the top wall of some of said upper chambers, a chamber above the checker work, means for producing a substantially inert drying medium means for controlling circulation and recirculation of the drying medium to cause it to pass from the medium-producing means to the chamber above the checker work, through the checker work to the upper chamber, to the lower chambers, through the material and to the upper chambers.

9. In a drier a lower series of chambers, a substantially horizontal porous conveyor forming the top wall of the said chambers, a series of chambers above the conveyor of which a layer of material on the conveyor forms the bottom wall, checker work forming the top wall of some of said upper chambers, a chamber above the checker work, means for controlling a drying medium to cause it to pass to the chamber above the checker work, thence to at least one of the upper series of chambers, thence to the lower chambers, thence through the material to the upper chambers, each chamber having means for separately regulating the volume and velocity of the drying medium, and means for removing a portion of the mixture of fluids in the upper chamber resultant from passage of the drying medium through the material.

10. In a drier a lower series of chambers, a substantially horizontal porous conveyor forming the top wall of the said chambers, a series of chambers above the conveyor of which a layer of material on the conveyor forms the bottom wall, checker work forming the top wall of some of said upper chambers, a chamber above the checker work, means for controlling circulation and recirculation of a hot drying medium to cause it to pass to the chamber above the checker work, thence to at least one of the upper series of chambers, thence through the lower chambers and through the material to the upper chambers, means for removing a portion of the mixture of fluids resultant from passage of the drying medium through the material, and for recirculating the unremoved portion through the bed of material.

11. In a drier a lower series of chambers, a substantially horizontal porous conveyor forming the top wall of the chambers, a series of chambers above the conveyor of which a layer of material on the conveyor forms the bottom wall, checker work forming the top wall of some of the upper chambers, a chamber above the checker work, means for controlling circulation and recirculation of a drying medium to cause it to pass to the chamber above the checker work, thence to at least one of the upper series of chambers, thence through the lower chambers and through the material to the upper chambers, means for separately regulating the volume and velocity of the drying medium, means for removing a portion of the mixture of fluids resultant from the passage of the drying medium through the material, said circulating and recirculating means including passages so arranged that a single fan serves for moving the drying fluid.

12. A drier comprising a mixing chamber and a series of chambers, a porous conveyer having a run forming a common wall for all chambers and upon which the material to be dried is placed, means causing heated drying medium to pass through the mixing chamber, thence through any predetermined number of chambers of the series, thence through the conveyer and material into the mixing chamber, thence lengthwise of the chamber to again be passed through any number of the chambers of the series, thence through the material being dried, means for separately regulating the amount of drying material passing through the material from the chambers of the series, means by which hot inert drying medium is added to the mixing chamber to be mixed with the mixed medium of the chambers and means for venting a portion of the mixture after passage through the mixing chamber.

13. A drier comprising a mixing chamber and a series of chambers, a porous conveyer having a run forming a common wall for all chambers and upon which the material to be dried is placed, means causing heated drying medium to pass through any predetermined number of chambers of the series through the conveyer and material into the mixing chamber, thence lengthwise of the chamber to again be passed through any number of the chambers of the series and through the material being dried, means by which drying medium is heated in the mixing chamber.

14. In a drier, an upper and a lower chamber, a substantially horizontal porous conveyor in part forming a wall for the chambers, a chamber in which a substantially inert hot drying medium is produced, a chamber having a checker work bottom forming the roof of the upper chamber, a manifold and valve controlled passages connecting the same with the chambers in which the drying medium is produced and with said lower chamber, a passage connecting the upper chamber with said manifold, and a fan adapted to circulate products of combustion from said medium-producing chamber, thence to the chamber, above the checker work thence to the upper chamber below the checker work, thence to the manifold and lower chamber.

15. A drier comprising a series of chambers, and a mixing chamber, a porous conveyer having a run forming a common wall for the chambers and upon which the material to be dried is placed and through which conveyer and material hot drying medium is passed from the series of chambers to the mixing chamber, means for introducing hot drying medium into the mixing chamber, means for circulating the gas through the mixing chamber and to the series of chambers, means for separately regulating the amount of drying material passing from each of the series of chambers to pass through the material to the mixing chamber, and means by which reheated medium is passed through the mixing chamber and again passed into the lower chambers and through the material into the mixing chamber.

HENRY G. LYKKEN.
ROBERT L. SUTHERLAND.